United States Patent
Lin et al.

(10) Patent No.: US 10,125,788 B2
(45) Date of Patent: Nov. 13, 2018

(54) CERAMIC TILE FAN BLADE CONTAINMENT

(71) Applicant: General Electric Company, Schenectady, NY (US)

(72) Inventors: Wendy Wen-Ling Lin, Montgomery, OH (US); David Sujay Kingsley, Cincinnati, OH (US); Benjamin James Roby, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 417 days.

(21) Appl. No.: 14/991,817

(22) Filed: Jan. 8, 2016

(65) Prior Publication Data

US 2017/0198714 A1   Jul. 13, 2017

(51) Int. Cl.
*F04D 29/52* (2006.01)
*F04D 29/02* (2006.01)
(Continued)

(52) U.S. Cl.
CPC ........ *F04D 29/526* (2013.01); *B29C 65/4805* (2013.01); *B29C 66/1286* (2013.01);
(Continued)

(58) Field of Classification Search
CPC .... F04D 29/526; F04D 29/023; F04D 29/325; B29C 65/4805; B29C 66/12821;
(Continued)

(56) References Cited

U.S. PATENT DOCUMENTS 3,367,630 A * 2/1968 Saunders ................ F01D 5/225
                                                    416/190
3,425,665 A * 2/1969 Lingwood ............... F01D 11/08
                                                    415/134

(Continued)

FOREIGN PATENT DOCUMENTS

EP         0 286 815 B1     4/1987

OTHER PUBLICATIONS

3M VHB Tapes, Technical Data, Oct. 2014.
3M Industrial Adhesives & Tapes, 3M VHB permanent assembly tapes, Proven alternatives to screws, rivets and welds.

*Primary Examiner* — Dwayne J White
*Assistant Examiner* — Adam W Brown
(74) *Attorney, Agent, or Firm* — General Electric Company; Brian Overbeck (57) ABSTRACT

Fan blade containment system includes circular tile layer of annular ceramic tiles attached to and extending radially inwardly from a shell, radially inner and outer annular surfaces of ceramic tiles bonded to a radially inner composite layer and the shell respectively with elastomeric inner and outer adhesive layers respectively. Elastomeric adhesive layers between circumferentially adjacent overlapped or scarfed edges along circumferential edges of the ceramic tiles overlap and mate along oppositely facing surfaces of adjacent ones of the ceramic tiles. Inner and outer adhesive layers and elastomeric adhesive layer may be a double-sided adhesive foam tape. Scarfed edges may be bevels or rabbets. Shell may be made of a metal or composite material. Fan blade containment system may be bonded to and extend inwardly from fan case circumscribing fan blades of a fan. Inner composite layer and composite outer shell may be co-cured with ceramic tiles therebetween.

24 Claims, 7 Drawing Sheets

(51) Int. Cl.
| | |
|---|---|
| F04D 29/32 | (2006.01) |
| B29C 70/30 | (2006.01) |
| B29C 70/70 | (2006.01) |
| B29C 65/48 | (2006.01) |
| B32B 18/00 | (2006.01) |
| B32B 3/14 | (2006.01) |
| B29C 65/00 | (2006.01) |
| B32B 5/02 | (2006.01) |
| B32B 5/18 | (2006.01) |
| B32B 5/24 | (2006.01) |
| B32B 7/12 | (2006.01) |
| B32B 9/00 | (2006.01) |
| B32B 9/04 | (2006.01) |
| B32B 15/04 | (2006.01) |
| B32B 15/06 | (2006.01) |
| B32B 15/18 | (2006.01) |
| B32B 15/20 | (2006.01) |
| B32B 25/04 | (2006.01) |
| B32B 25/10 | (2006.01) |
| B32B 25/14 | (2006.01) |
| B32B 25/16 | (2006.01) |
| B32B 25/20 | (2006.01) |
| B32B 1/00 | (2006.01) |
| B32B 3/02 | (2006.01) |
| B32B 3/06 | (2006.01) |
| B32B 3/18 | (2006.01) |
| C04B 37/00 | (2006.01) |
| C04B 37/02 | (2006.01) |
| F01D 21/04 | (2006.01) |
| B29K 709/02 | (2006.01) |
| B29L 31/00 | (2006.01) |
| B29C 65/50 | (2006.01) |
| B29C 65/02 | (2006.01) |

(52) U.S. Cl.
CPC ........ *B29C 66/12821* (2013.01); *B29C 70/30* (2013.01); *B29C 70/70* (2013.01); *B32B 1/00* (2013.01); *B32B 3/02* (2013.01); *B32B 3/06* (2013.01); *B32B 3/14* (2013.01); *B32B 3/18* (2013.01); *B32B 5/02* (2013.01); *B32B 5/18* (2013.01); *B32B 5/245* (2013.01); *B32B 7/12* (2013.01); *B32B 9/005* (2013.01); *B32B 9/043* (2013.01); *B32B 9/046* (2013.01); *B32B 15/046* (2013.01); *B32B 15/06* (2013.01); *B32B 15/18* (2013.01); *B32B 15/20* (2013.01); *B32B 18/00* (2013.01); *B32B 25/04* (2013.01); *B32B 25/10* (2013.01); *B32B 25/14* (2013.01); *B32B 25/16* (2013.01); *B32B 25/20* (2013.01); *C04B 37/008* (2013.01); *C04B 37/028* (2013.01); *F01D 21/045* (2013.01); *F04D 29/023* (2013.01); *F04D 29/325* (2013.01); *B29C 65/02* (2013.01); *B29C 65/5057* (2013.01); *B29C 66/5326* (2013.01); *B29C 66/61* (2013.01); *B29C 66/721* (2013.01); *B29C 66/73751* (2013.01); *B29C 66/7461* (2013.01); *B29K 2709/02* (2013.01); *B29L 2031/7504* (2013.01); *B32B 2250/05* (2013.01); *B32B 2262/00* (2013.01); *B32B 2266/0242* (2013.01); *B32B 2307/306* (2013.01); *B32B 2307/50* (2013.01); *B32B 2307/51* (2013.01); *B32B 2307/542* (2013.01); *B32B 2307/56* (2013.01); *B32B 2307/732* (2013.01); *B32B 2603/00* (2013.01); *B32B 2605/18* (2013.01); *C04B 2237/32* (2013.01); *C04B 2237/38* (2013.01); *C04B 2237/402* (2013.01); *C04B 2237/403* (2013.01); *C04B 2237/406* (2013.01); *F05D 2300/20* (2013.01); *Y02T 50/672* (2013.01)

(58) Field of Classification Search
CPC ....... B29C 66/1286; B32B 3/14; B32B 18/00; B29K 2709/02; B29L 2031/7504; F01D 11/127
USPC ...................................... 415/174.4
See application file for complete search history.

(56) References Cited

U.S. PATENT DOCUMENTS

| | | | | |
|---|---|---|---|---|
| 4,289,447 | A | | 9/1981 | Sterman et al. |
| 4,547,122 | A | | 10/1985 | Leech |
| 4,596,116 | A | * | 6/1986 | Mandet ................ F01D 11/08 415/173.2 |
| 4,646,810 | A | | 3/1987 | Lardellier |
| 4,818,176 | A | | 4/1989 | Huether et al. |
| 5,403,148 | A | | 4/1995 | Forrester |
| 5,447,411 | A | | 9/1995 | Curley et al. |
| 5,456,576 | A | * | 10/1995 | Lyon .................... F01D 5/20 415/173.3 |
| 6,113,347 | A | * | 9/2000 | Forrester .............. F01D 21/045 415/173.4 |
| 6,315,519 | B1 | * | 11/2001 | Bagepalli ............... F01D 11/08 415/135 |
| 6,637,186 | B1 | * | 10/2003 | Van Duyn .............. F01D 11/12 415/9 |
| 6,979,172 | B1 | | 12/2005 | Mackenzie |
| 7,246,990 | B2 | | 7/2007 | Xie et al. |
| 7,713,021 | B2 | | 5/2010 | Finn et al. |
| 8,016,543 | B2 | * | 9/2011 | Braley ................. F01D 21/045 415/173.4 |
| 8,021,102 | B2 | | 9/2011 | Xie et al. |
| 8,046,915 | B2 | | 11/2011 | Xie et al. |
| 8,061,966 | B2 | | 11/2011 | Xie et al. |
| 8,092,164 | B2 | * | 1/2012 | Moon .................... F01D 25/24 415/200 |
| 8,177,493 | B2 | * | 5/2012 | Castel ................... F01D 9/04 415/173.4 |
| 8,333,558 | B2 | | 12/2012 | Finn et al. |
| 8,403,624 | B2 | | 3/2013 | Xie et al. |
| 9,909,457 | B2 | * | 3/2018 | DaCunha ............ F01D 25/246 |
| 2008/0145215 | A1 | | 6/2008 | Finn et al. |
| 2009/0155065 | A1 | | 6/2009 | Xie et al. |
| 2009/0226310 | A1 | | 9/2009 | Finn et al. |
| 2013/0153456 | A1 | | 6/2013 | Zhu et al. |
| 2016/0245102 | A1 | * | 8/2016 | Freeman ............... F01D 11/005 |

* cited by examiner

CERAMIC TILE FAN BLADE CONTAINMENT

BACKGROUND OF THE INVENTION

Technical Field

The present invention relates to gas turbine engine fan blade containment and, more specifically, to fan blade containment using ceramic tiles.

Background Information

Aircraft gas turbine engines include fan blade containment systems for retaining fan blades or fan blade fragments which may break off during engine operation. Fan blade failure can occur for a variety of reasons, but is commonly caused when a bird, hailstone, or any other foreign object strikes the engine fan while the engine is in operation. An uncontained fan blade failure may cause serious damage to the aircraft fuselage because of the high velocity of the fan blade or blade fragments. It is therefore necessary to provide some containment system near the engine fan for retaining any blade or blade fragments which break off the engine fan during operation. Such a containment system should be provided near the point where fan blade failure will cause the blade or blade fragment to travel.

Fan blade containment systems have been previously proposed for use in turbofan engines. These containment systems are designed to provide adequate retention of fan blade fragments without increasing the overall weight of the engine shroud. Certain prior containment systems utilized a metallic honeycomb structure for retaining fan blade fragments. Other systems disclose the use of ceramics as a part of an overall fan blade retention system, such as, in U.S. Pat. Nos. 4,289,447; 4,547,122; 4,646,810; and 4,818,176.

U.S. Pat. No. 5,447,411, issued to Curley et al. Sep. 5, 1995, and entitled "Light Weight Fan Blade Containment System" discloses a hard faced fan blade containment system for turbofan aircraft engines. The product combines a hard facing material, a high-strength fiber, and an elastomeric binder to form a fan blade containment system which is lightweight and effectively retains fan blade fragments. A hard material, such as ceramic or metal, is encapsulated in an elastomer and bonded to the impact face of the containment system to blunt sharp edges of failed blade fragments and to absorb some of the impact energy of the blade fragments.

Ceramic tiles offer additional energy absorption for a fan blade containment within a fan casing. However, the attachment of the ceramic tiles can be challenging because thermal expansion mismatch and high modulus will cause disbonds between the ceramic and containment structure. A rubber or elastomeric layer (typically RTV or sealant materials such as polysulfide) between the ceramic and structure can abate a Coefficient of Thermal Expansion (CTE) mismatch between the ceramic tiles and structure supporting the ceramic tiles. However, the RTV produces inconsistent bondline and gaps between the ceramic tiles which can allow the fan blade or blade fragments to penetrate and become the weak link during blade out. RTV also requires several hours to a few days to cure before subsequent process steps can be continued leading to long cycle times. The RTV and sealants are also not typically compatible with subsequent high temperature cure cycles.

It is highly desirable to have a fan containment system with ceramic tiles that has consistent and thin bondline and no gaps between the ceramic tiles. It is also desirable to have a fan containment system which abates a Coefficient of Thermal Expansion (CTE) mismatch between the ceramic tiles and structure supporting the ceramic tiles. It is also desirable to have a fan containment system with ceramic tiles that has short bond times and is compatible with subsequent high temperature cure cycles.

SUMMARY OF THE INVENTION

A fan blade containment system includes annular ceramic tiles arranged in at least one circular tile layer attached to and extending radially inwardly from a shell, radially inner and outer annular surfaces of the ceramic tiles bonded to a radially inner composite layer and the shell respectively with elastomeric inner and outer adhesive layers respectively, circumferentially and radially facing overlapped or scarfed edges along circumferential edges of the ceramic tiles, elastomeric adhesive layers between circumferentially adjacent ones of the overlapped or scarfed edges, and the overlapped or scarfed edges of the circumferentially adjacent ones of the ceramic tiles in the tile layer overlap and mate along oppositely facing surfaces of the adjacent ones of the ceramic tiles.

The inner and outer adhesive layers and the elastomeric adhesive layer may include a double-sided adhesive foam tape. The scarfed edges may be bevels or rabbets. The shell may be made of a metal or composite material. The inner composite layer and the composite outer shell may be co-cured with the ceramic tiles therebetween.

A gas turbine engine fan section may include a fan case circumscribing fan blades of a fan, and the fan blade containment system circumscribing the fan blades and bonded to and extending radially inwardly from the fan case.

Methods of forming a fan blade containment system for a turbofan gas turbine engine include forming a lay-up for co-curing by laying up an inner composite layer on a mold or tool, applying an elastomeric adhesive layer on radially inner annular surfaces of a plurality of ceramic tiles and forming a circular row or layer tile layer of the ceramic tiles on the inner composite layer, applying another elastomeric adhesive layer on outer annular surfaces of the ceramic tiles, laying up a composite outer shell on the elastomeric adhesive layer on the outer annular surfaces of the ceramic tiles. Then curing the lay-up by co-curing the inner composite layer, composite outer shell, and the circular row or tile layer of the ceramic tiles disposed therebetween. The elastomeric adhesive layer may also be applied on circumferentially facing overlapped or scarfed edges, of the ceramic tiles. The elastomeric adhesive layer may be foam tape including a flexible foam core with adhesive on two opposite sides of the foam tape.

BRIEF DESCRIPTION OF THE DRAWINGS

The invention, in accordance with preferred and exemplary embodiments, is more particularly described in the following detailed description taken in conjunction with the accompanying drawings in which.

DESCRIPTION

Figure 1:
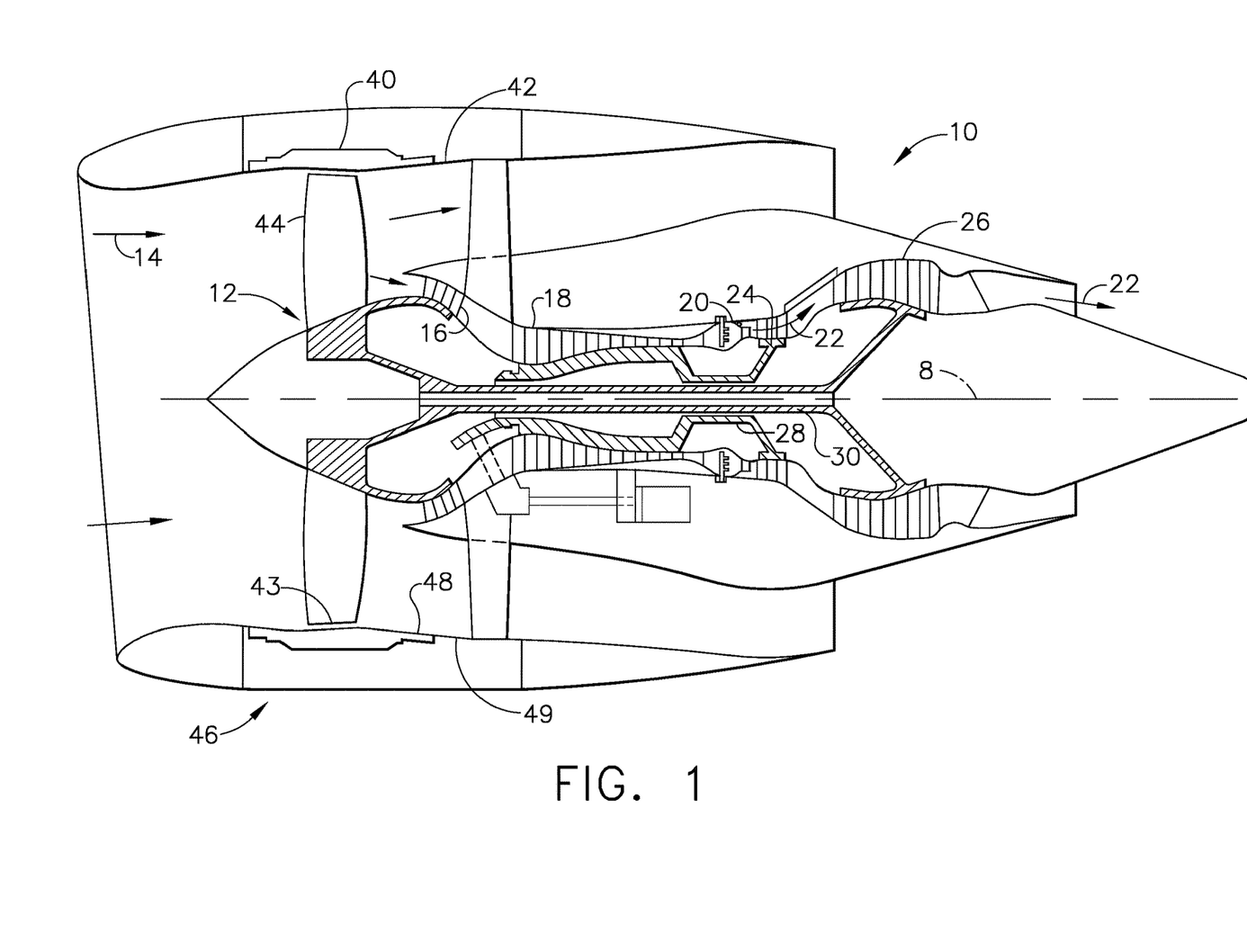
FIG. 1 is a cross-sectional illustration of an exemplary aircraft turbofan gas turbine engine including a fan containment system with a circular row of ceramic tiles.

Illustrated schematically in FIG. 1 is an exemplary turbofan gas turbine engine 10 circumscribed about a centerline axis 8. The engine 10 includes in downstream flow relationship, a fan 12 which receives ambient air 14, a low pressure or booster compressor 16, a high pressure compressor (HPC) 18, a combustor 20 which mixes fuel with the air 14 pressurized by the HPC 18 for generating combustion gases 22 which flow downstream through a high pressure turbine (HPT) 24, and a low pressure turbine (LPT) 26 from which the combustion gases 22 are discharged from the engine 10. A first or high pressure shaft 28 joins the HPT 24 to the HPC 18, and a second or low pressure shaft 30 joins the LPT 26 to both the fan 12 and the low pressure compressor 16.

A fan section 46 of the engine 10 includes a fan case 42 manufactured from, e.g., steel, aluminum, titanium, a composite or any other high-strength material. The fan case 42 circumscribes and surrounds fan blades 44 of the fan 12. A fan blade containment system 40 circumscribes and surrounds the fan 12 and the fan blades 44 to retain any fan blades 44 or fan blade fragments dislodged from the engine fan 12. The fan blade containment system 40 is bonded to and extends radially inwardly from the fan case 42. The fan blade containment system 40 includes a composite or metal outer shell 49 attached to a fan blade casing 48 manufactured of, e.g., steel, aluminum, titanium, or a composite which is a lightweight and high-strength material.

Figure 2:
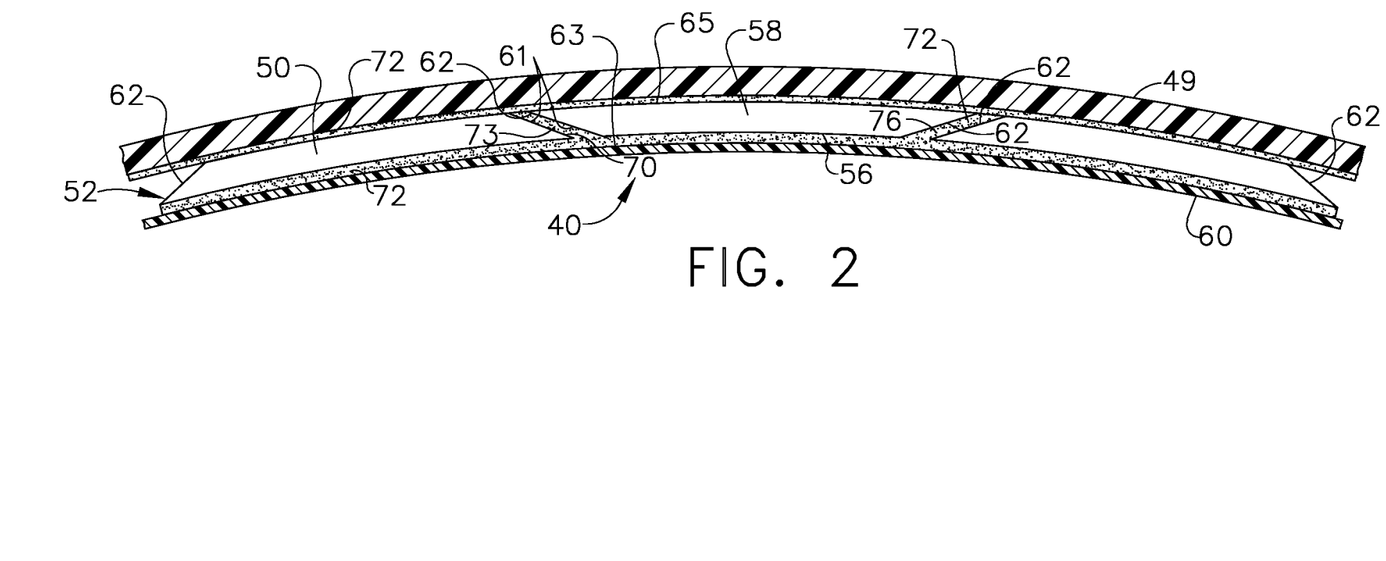
FIG. 2 is a schematical cross-sectional view illustration of adjacent ceramic tiles in the row of ceramic tiles illustrated and through 2-2 in FIG. 1.
Figure 3:
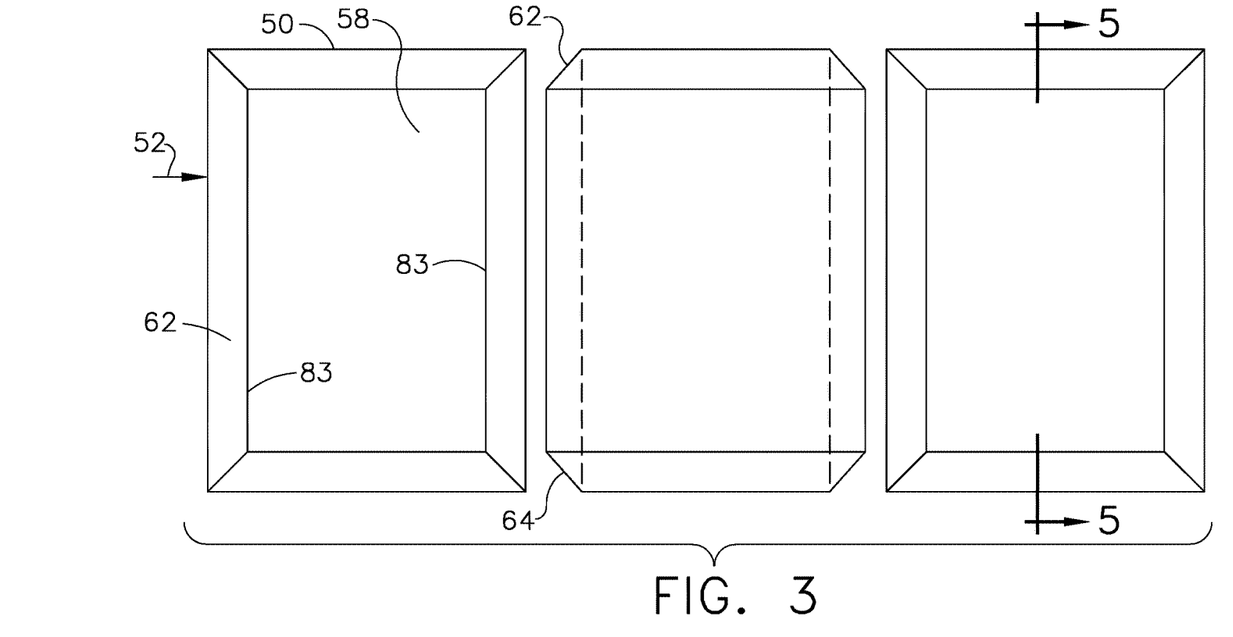
FIG. 3 is a schematical perspective view illustration of adjacent ceramic tiles in the row of ceramic tiles illustrated in FIG. 2.
Figure 11:
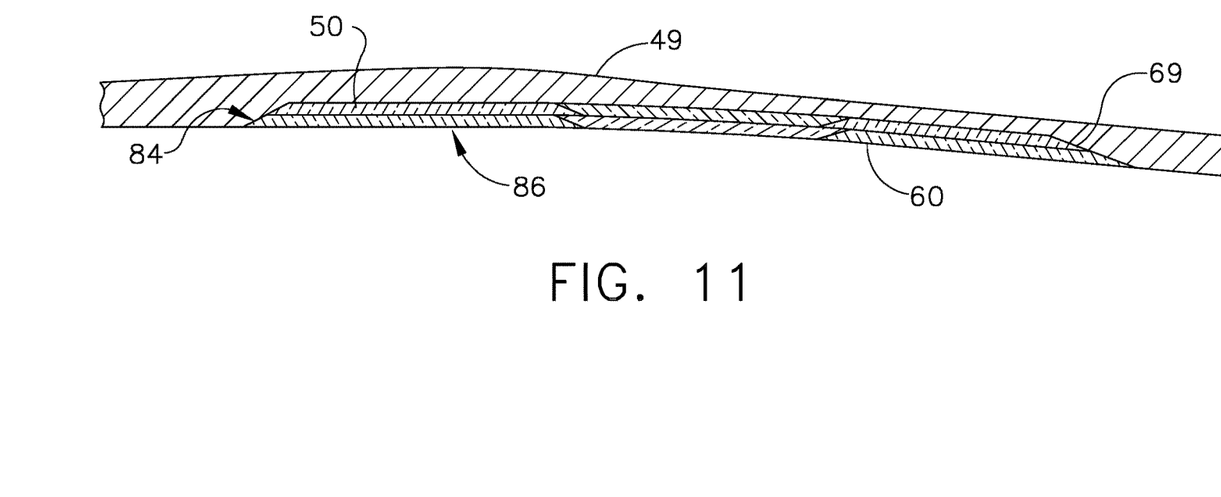
FIG. 11 is a schematical cross sectional view illustration of an alternative fan containment system with more than one circular row of ceramic tiles.

Illustrated in FIG. 2 is the fan blade containment system 40 including at least one circular row or tile layer 52 attached to and located radially inwardly of the shell 49. The circular row or tile layer 52 includes annular ceramic tiles 50 arranged in the circular row or tile layer 52. FIGS. 2-10 illustrate a single circular row or tile layer 52 and FIG. 11 illustrates an alternative fan containment system with more than one circular row of ceramic tiles. The fan containment system illustrated in FIG. 11 includes axially and radially adjacent circular rows 84, 86 of ceramic tiles 50.

Figure 4:
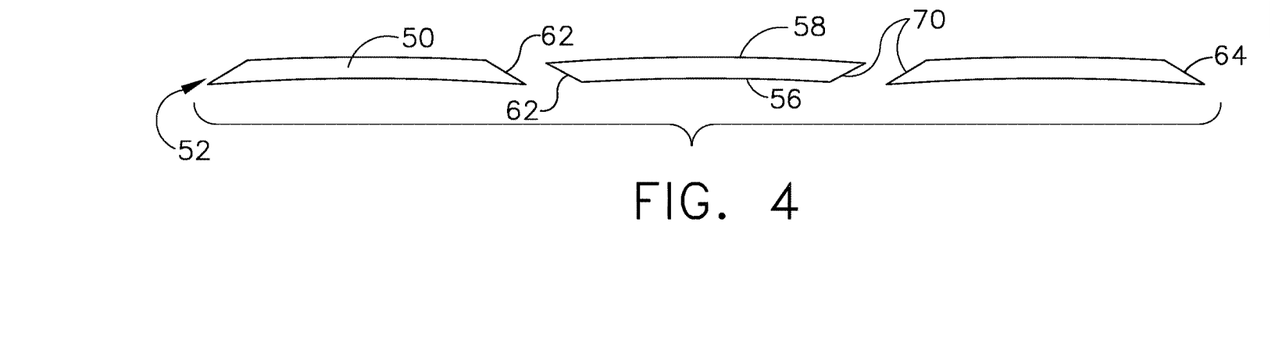
FIG. 4 is a forward looking aft schematical perspective view illustration of the adjacent ceramic tiles illustrated in FIG. 3.
Figure 5:
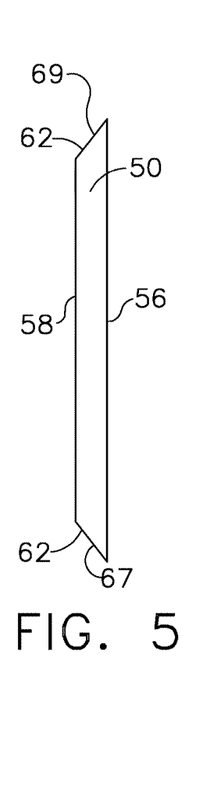
FIG. 5 is a cross-sectional schematical view illustration of one of the adjacent ceramic tiles through 5-5 in FIG. 3.

Radially inner and outer annular surfaces 56, 58 of the ceramic tiles 50 are bonded to a radially inner composite layer 60 and the shell 49 respectively with elastomeric inner and outer adhesive layers 63, 65 respectively. The inner and outer annular surfaces 56, 58 are cylindrical as indicated in FIGS. 4 and 5. FIG. 4 is an axial view of three of the ceramic tiles 50 illustrating the circular inner and outer annular surfaces 56, 58 as viewed axially. FIG. 5 is a circumferential view taken through 5-5 of the ceramic tile 50 illustrated in FIG. 3 as viewed in the circumferential as indicated by the arrows in FIG. 3. Thus, illustrating the ceramic tiles 50 are cylindrical and curved about the centerline axis 8 illustrated in FIG. 1.

The ceramic tiles 50 illustrated in FIGS. 2-5 have overlapped edges 61. The overlapped edges 61 are illustrated herein as circumferentially and radially facing scarfed edges 62 along circumferential edges 83 of the ceramic tiles 50. The scarfed edges 62 are illustrated herein as bevels 64 in FIGS. 2-5 and as rabbets 66 in FIG. 10. The bevels 64 and the rabbets 66 of circumferentially adjacent ceramic tiles 50 in the tile layer 52 overlap and are shaped to mate along oppositely facing surfaces 70. A scarf may be either of the chamfered or cutaway ends that fit together to form a scarf joint. Scarf is a term that may also be an in-line joint made by chamfering, halving, or notching two pieces to correspond and lapping them such as a shiplap joint with rabbets. The scarfed edges 62 of the ceramic tiles 50 help prevent released fan blades 44 or fan blade fragments dislodged from the engine fan 12 from penetrating between the ceramic tiles 50 directly into the shell 49. The ceramic tiles 50 also have axially forward and aft facing bevels 67, 69 as illustrated in FIG. 5.

The inner and outer adhesive layers 63, 65 may be elastomeric adhesive layers 72 which may be made from thin foam tape or elastomeric layer or film of controlled thickness (e.g. variance ±0.002 inches) covered on at least one side with a pressure sensitive adhesive compatible with the mating structure. The elastomeric adhesive layer 72 is applied to the ceramic tiles 50 for attaching the radially inner and outer annular surfaces 56, 58 of the ceramic tiles 50 to the radially inner composite layer 60 and the shell 49 respectively. Edge adhesive layers 76 which may be in the form of an elastomeric adhesive layer 72 is also applied to cover the overlapped edges 61, such as the scarfed edges 62, of the ceramic tiles 50. Alternatively, the inner and outer adhesive layers 63, 65 and the edge adhesive layers 76 may be made from thin silicone (or other elastomer capable of handling high temperatures and pressures) sheet with pressure sensitive film adhesive. Non-exclusive examples of other elastomers are nitrile rubber, EPDM, fluorinated elastomers, and polyurethanes. Elastomeric adhesive layers may be disposed between the axially and radially adjacent circular rows 84, 86 of ceramic tiles 50 In the fan containment system illustrated in FIG. 11.

One suggested material for the elastomeric adhesive layers 72 is a double-sided adhesive foam tape also referred to as an elastomeric adhesive tape such as VHB (4646 or 4611) sold by and a trademark of 3M which is typically used in automotive, construction or wind energy applications. Elastomeric polyurethane tape such as 3M's Polyurethane Protective Tape (e.g. 8734NA or 8730NA) designed as an erosion film may also be used. A thin silicone sheeting (or other elastomer capable of handling autoclave temperatures and pressures) with pressure sensitive film adhesive may be another alternative elastomeric adhesive layer 72.

The foam tape includes a flexible foam core with adhesive on two opposite sides of the foam tape. The foam tape is a double-sided adhesive bonding tape used to bond glass, wood, steel, concrete, foam, and plastic together with strength and speed needed for permanent, structural and repositionable applications. VHB tape is known for providing shear strength, conformality, surface adhesion and temperature resistance. 3M VHB tapes are known for their use as high-strength bonding tape which "permanently" adheres one substrate to another while spreading the stress load across the entire length of the joint. 3M VHB tapes are made with acrylic foam which is viscoelastic in nature. This gives the foam energy absorbing and stress relaxing properties which provides these tapes with their unique characteristics.

The foam tape is wrapped around the ceramic tiles 50 such that it forms a controlled thin grout line 73 between ceramic tiles 50 when they are assembled in the tile layer 52. The foam tape includes a very compliant foam elastomeric layer or film which reduces interfacial stresses between the ceramic tiles 50 and a containment structure, which is illustrated herein by the outer shell 49. The foam tape has consistent thickness with sufficient compliance to manage tolerance mismatch between the ceramic tiles 50 and the fan blade casing 48. Pressure sensitive adhesive on the foam tape holds the ceramic tiles 50 in place within seconds and allows the next step of the process of making the fan blade containment system 40 without waiting for cure. The foam tape retains its elastomeric characteristic after autoclave or oven curing.

The tile layer 52 of the ceramic tiles 50 may be attached to the fan blade casing 48 either before or after curing the layers of fan blade containment system 40. The autoclave or oven cures the inner composite layer 60 to which the ceramic tiles 50 are bonded. The autoclave or oven may also be used to cure the outer shell 49 if it is made of a composite material and to which the ceramic tiles 50 are bonded. The curing may be performed after the ceramic tiles 50 are bonded to the inner composite layer 60 and the composite outer shell 49 with the foam tape or other elastomeric adhesive layer 72 as illustrated in FIG. 2.

Figure 6:
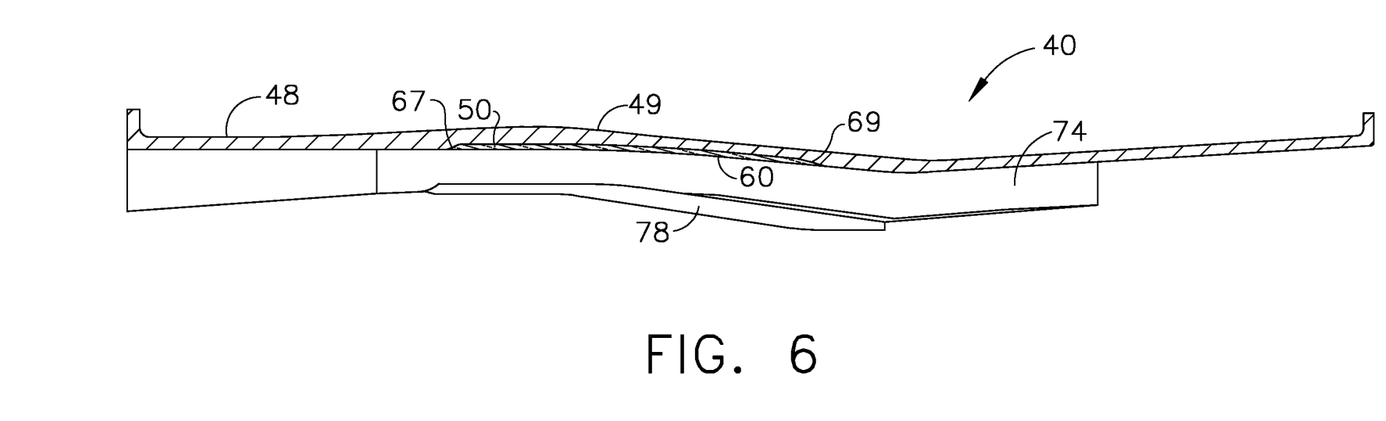
FIG. 6 is an enlarged cross-sectional schematical illustration of the fan containment system illustrated in FIG. 1 configured when with a composite fan blade casing co-cured with the fan containment system.
Figure 7:
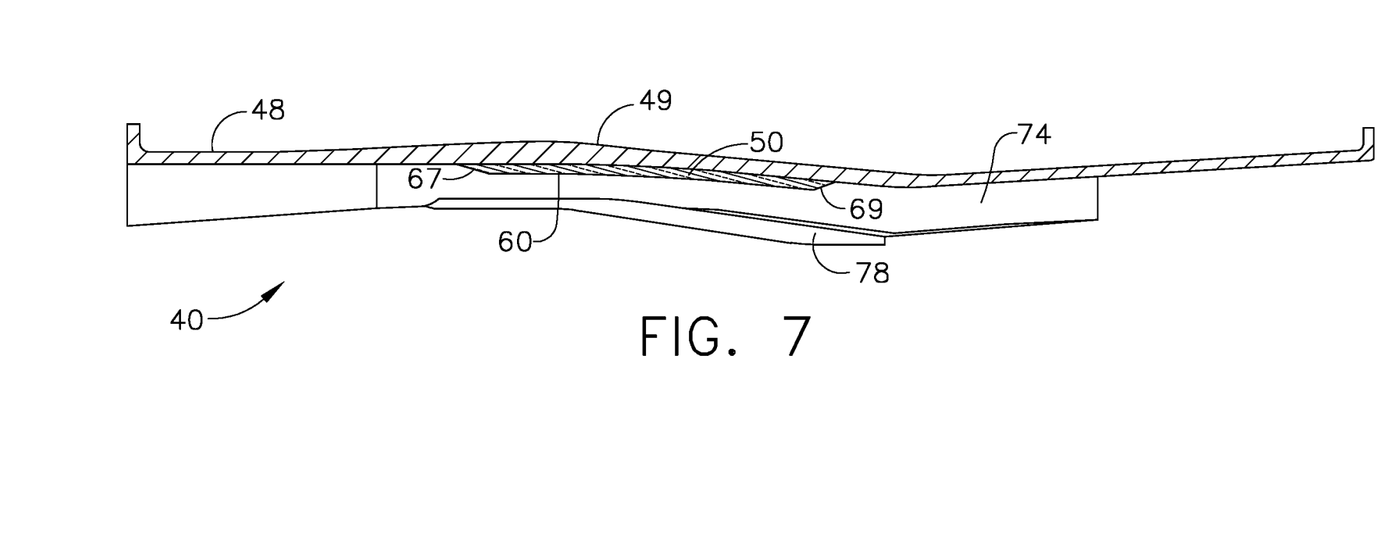
FIG. 7 is cross-sectional schematical flow chart illustration of an alternative fan containment system configured when the ceramic tiles are bonded into the fan blade casing after a composite fan blade casing is cured or a non-cured fan blade casing is used.

Illustrated in FIGS. 6 and 7 are two different configurations of the fan blade containment system 40. The configuration illustrated in FIG. 6 includes the ceramic tiles 50 bonded to the composite outer shell 49 before curing. The inner composite layer 60 and the composite outer shell 49 are co-cured with the ceramic tiles 50 disposed therebetween. The configuration illustrated in FIG. 7 includes the ceramic tiles 50 bonded to the metallic or composite metal outer shell 49 and to the inner composite layer 60 after the composite outer shell 49 had already been cured. Also illustrated in FIGS. 6 and 7 is a lightweight core 74 made of a material such as honeycomb core extending radially inwardly from and attached to the fan blade containment system 40 including the ceramic tiles 50 between the outer shell 49 and the inner composite layer 60. An abradable layer 78 extending radially inwardly from and attached to the core 74 provides a seal for tips 43 of the fan blades 44.

Figure 8:
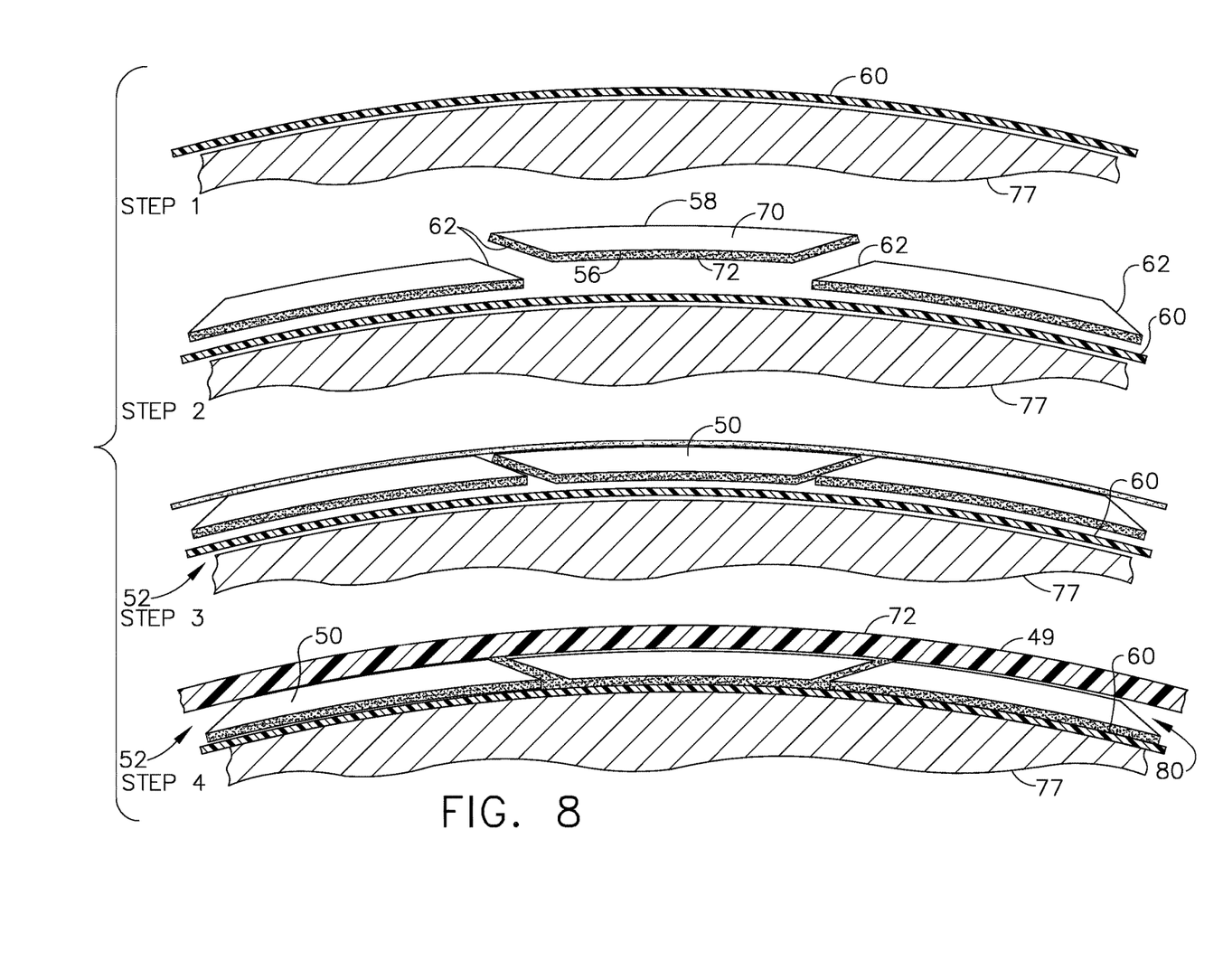
FIG. 8 is a flow chart illustration of a lay-up sequence for the fan containment system illustrated in FIG. 6.

Illustrated in FIG. 8 are four steps used in an exemplary method for forming a lay-up 80 for co-curing the inner composite layer 60, composite outer shell 49, and the tile layer 52 of the ceramic tiles 50 disposed therebetween to make the fan blade containment system 40 Illustrated in FIGS. 2 and 6. Step 1 includes laying up the inner composite layer 60 on a mold or tool 77. Step 2 includes applying the elastomeric adhesive layer 72 such as a thin foam or elastomeric layer or film containing double-sided adhesive such as a VHB tape on the radially inner annular surfaces 56 and overlapped edges 61 such as the circumferentially facing scarfed edges 62 of the ceramic tiles 50. Step 2 further includes forming the circular row or layer tile layer 52 of the ceramic tiles 50 on the inner composite layer 60. Step 3 includes applying the elastomeric adhesive layer 72 on the outer annular surfaces 58 of the ceramic tiles 50. Step 4 includes laying up the composite outer shell 49 on the elastomeric adhesive layer 72 on the outer annular surfaces 58 of the ceramic tiles 50. The lay-up 80 is then cured such as by autoclaving to form the fan blade containment system 40.

Figure 9:
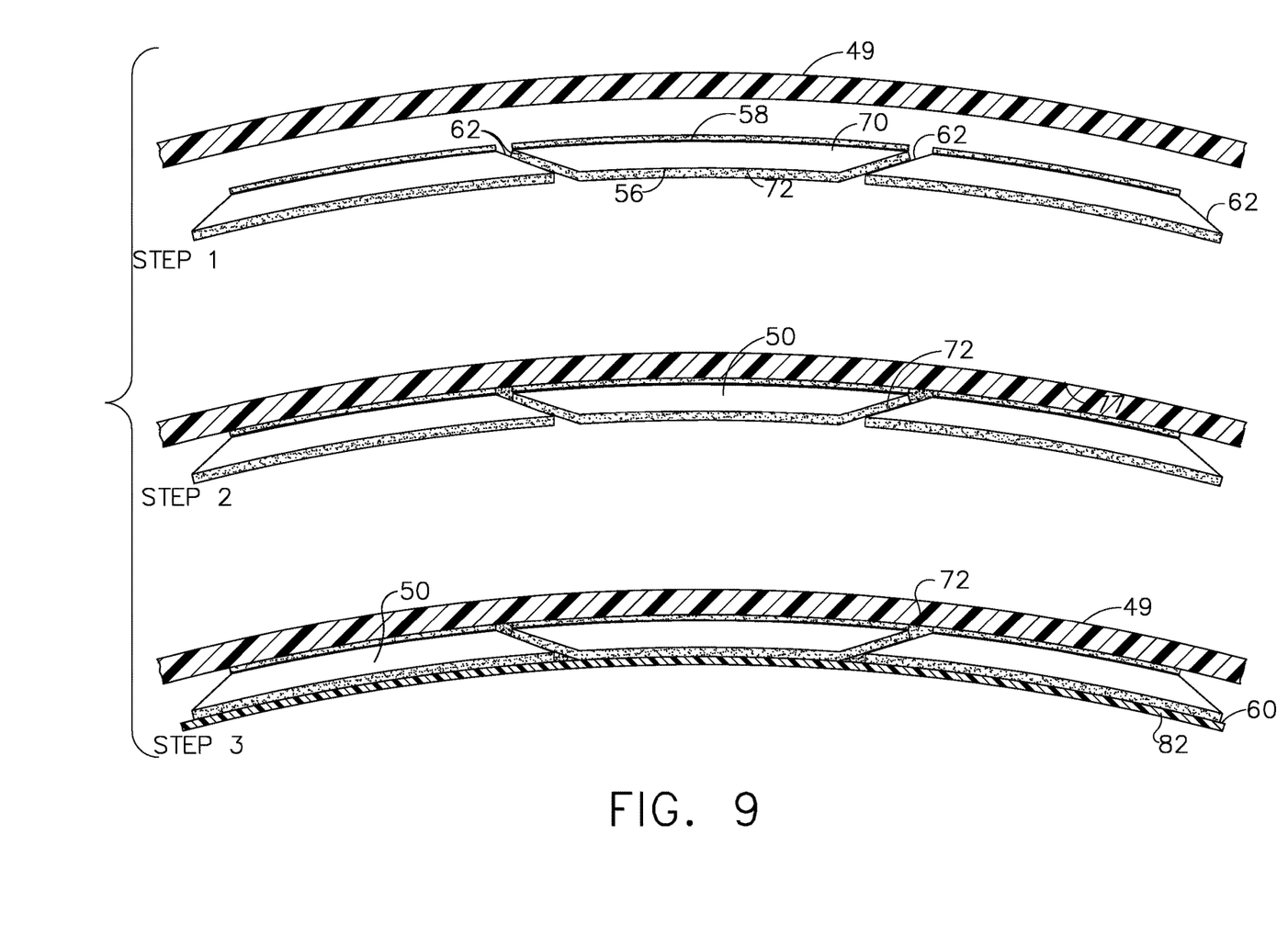
FIG. 9 is a flow chart illustration of a lay-up sequence for the fan containment system illustrated in FIG. 7.
Figure 10:
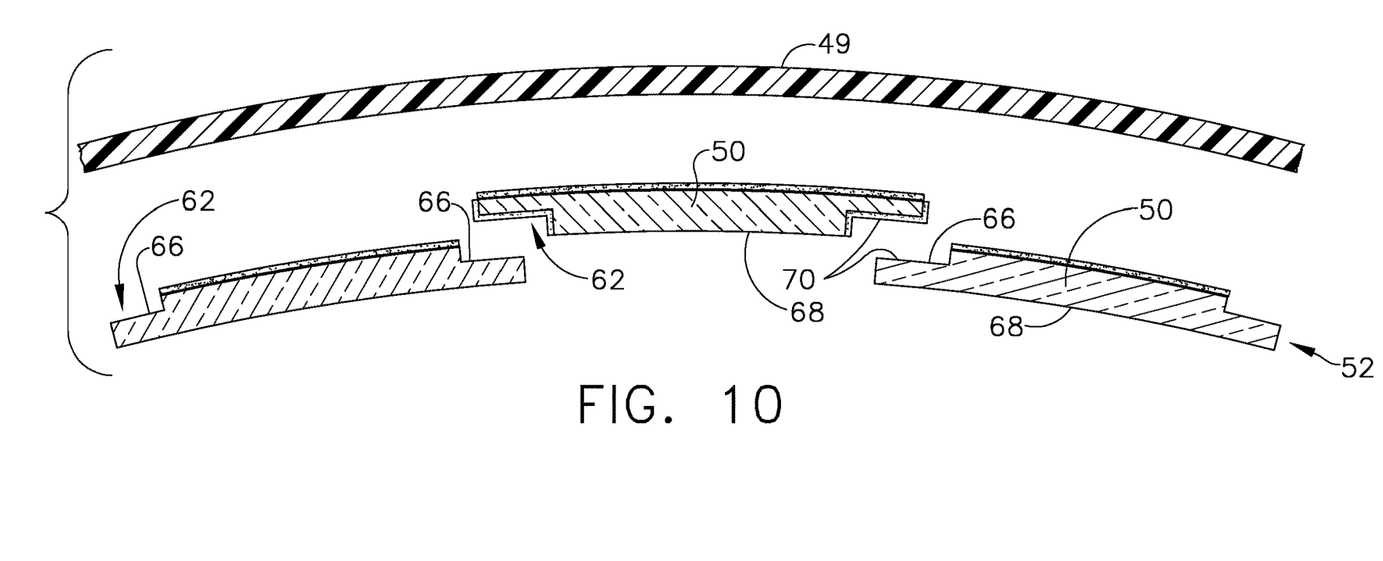
FIG. 10 is a schematical cross sectional view illustration of adjacent alternative ceramic tiles with shiplapped circumferential overlapped ends in the row of ceramic tiles illustrated in FIG. 2.

Illustrated in FIG. 9 are three steps used in an exemplary method for forming by bonding together layers of the fan blade containment system 40 illustrated in FIGS. 2 and 7. The fan blade containment system 40 including an inner composite layer 60, a metal or cured composite outer shell 49, and the tile layer 52 of the ceramic tiles 50 disposed therebetween. Step 1 includes applying the elastomeric adhesive layer 72 such as a thin foam or elastomeric layer or film containing double-sided adhesive such as a VHB tape on the radially outer annular surfaces 58 and overlapped edges 61 such as the circumferentially facing scarfed edges 62 of the ceramic tiles 50. Then apply the ceramic tiles 50 to the metal or cured composite outer shell 49 arranged to form the tile layer 52 on and extending radially inwardly from the outer shell 49. Step 2 includes applying the elastomeric adhesive layer 72 on the inner annular surfaces 56 of the ceramic tiles 50. Step 3 includes laying up a composite fabric 82 on the elastomeric adhesive layer 72 covering the inner annular surfaces 56 of the ceramic tiles 50. Another cure step is required to cure the inner composite fabric 82 layer.

While there have been described herein what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

What is claimed is:
1. A fan blade containment system comprising:
annular ceramic tiles arranged in at least one circular tile layer attached to and extending radially inwardly from a shell,
radially outer annular surfaces of the ceramic tiles bonded to the shell with an elastomeric outer adhesive layer,
circumferentially and radially facing overlapped edges along circumferential edges of the ceramic tiles,
elastomeric adhesive layers between circumferentially adjacent ones of the overlapped edges, and
the overlapped edges of the circumferentially adjacent ones of the ceramic tiles in the tile layer overlap and mate along oppositely facing surfaces of the adjacent ones of the ceramic tiles.
2. The system as claimed in claim 1, further comprising radially inner annular surfaces of the ceramic tiles bonded to a radially inner composite layer with an elastomeric inner adhesive layer.
3. The system as claimed in claim 2, further comprising the inner and outer adhesive layers and the elastomeric adhesive layer including a double-sided adhesive foam tape.
4. The system as claimed in claim 2, further comprising the inner and outer adhesive layers and the elastomeric adhesive layer having controlled thicknesses variances of about +0.002 inches.
5. The system as claimed in claim 2, further comprising the overlapped edges including scarfed edges, bevels, or rabbets.
6. The system as claimed in claim 2, further comprising the shell made of a metal or composite material.

7. The system as claimed in claim 2, further comprising the inner composite layer and the composite outer shell co-cured with the ceramic tiles therebetween.

8. The system as claimed in claim 2, further comprising the ceramic tiles having been bonded to the composite outer shell and to the inner composite layer after the composite outer shell had already been cured.

9. A gas turbine engine fan section comprising:
a fan case circumscribing fan blades of a fan,
a fan blade containment system circumscribing the fan blades and bonded to and extending radially inwardly from the fan case,
a fan blade containment system including annular ceramic tiles arranged in at least one circular tile layer attached to and extending radially inwardly from a shell,
radially outer annular surfaces of the ceramic tiles bonded to the shell with an elastomeric outer adhesive layer,
circumferentially and radially facing overlapped edges along circumferential edges of the ceramic tiles,
elastomeric adhesive layers between circumferentially adjacent ones of the overlapped edges, and
the overlapped edges of the circumferentially adjacent ones of the ceramic tiles in the tile layer overlap and mate along oppositely facing surfaces of the adjacent ones of the ceramic tiles.

10. The fan section as claimed in claim 9, further comprising radially inner annular surfaces of the ceramic tiles bonded to a radially inner composite layer with an elastomeric inner adhesive layer.

11. The fan section as claimed in claim 10, further comprising the inner and outer adhesive layers and the elastomeric adhesive layer including a double-sided adhesive foam tape.

12. The fan section as claimed in claim 10, further comprising the overlapped edges including scarfed edges, bevels, or rabbets.

13. The fan section as claimed in claim 10, further comprising the shell made of a metal or composite material.

14. The fan section as claimed in claim 10, further comprising the inner composite layer and the composite outer shell co-cured with the ceramic tiles therebetween.

15. The fan section as claimed in claim 10, further comprising the ceramic tiles having been bonded to the composite outer shell and to the inner composite layer after the composite outer shell had been cured or the ceramic tiles having been bonded to the composite outer shell and to the inner composite layer after the composite outer shell had already been cured.

16. The fan section as claimed in claim 10, further comprising a core extending radially inwardly from and attached to the fan blade containment system and an abradable layer extending radially inwardly from and attached to the core to provide a seal for tips of the fan blades.

17. A method of forming a fan blade containment system for a turbofan gas turbine engine, the method comprising steps of:
1. forming a lay-up for co-curing by laying up an inner composite layer on a mold or tool,
2. forming a circular row or layer tile layer of the ceramic tiles on the inner composite layer,
3. applying an elastomeric adhesive layer on outer annular surfaces of the ceramic tiles,
4. laying up a composite outer shell on the elastomeric adhesive layer on the outer annular surfaces of the ceramic tiles, and
5. curing the lay-up by co-curing the inner composite layer, composite outer shell, and the circular row or tile layer of the ceramic tiles disposed therebetween.

18. The method as claimed in claim 17, further comprising in step 2 applying another elastomeric adhesive layer on radially inner annular surfaces of the ceramic tiles before forming the circular row or layer tile layer of the ceramic tiles on the inner composite layer.

19. The method as claimed in claim 18, further comprising in step 2 applying the elastomeric adhesive layer on circumferentially facing overlapped edges of the ceramic tiles.

20. The method as claimed in claim 19 wherein the elastomeric adhesive layer is foam tape including a flexible foam core with adhesive on two opposite sides of the foam tape.

21. The method as claimed in claim 19, further comprising controlling thicknesses variances of the inner and outer adhesive layers and the elastomeric adhesive layer to about ±0.002 inches when the applying the inner and outer adhesive layers and the elastomeric adhesive layer.

22. A method of forming a fan blade containment system for a turbofan gas turbine engine, the method comprising steps of:
1. applying an elastomeric adhesive layer on radially outer annular surfaces and circumferentially facing overlapped edges of a plurality of ceramic tiles,
2. forming at least one circular row or layer tile layer of the ceramic tiles on and extending radially inwardly from an outer shell, and
3. laying up a composite fabric on the inner annular surfaces of the ceramic tiles.

23. The method as claimed in claim 22, further comprising in step 3 applying another elastomeric adhesive layer on inner annular surfaces of the ceramic tiles before the laying up of the composite fabric on the inner annular surfaces of the ceramic tiles.

24. The method as claimed in claim 23 wherein the elastomeric adhesive layer is foam tape including a flexible foam core with adhesive on two opposite sides of the foam tape.

* * * * *